US012078420B2

(12) United States Patent
Hayashi et al.

(10) Patent No.: US 12,078,420 B2
(45) Date of Patent: Sep. 3, 2024

(54) MODULAR ENCLOSURE STRUCTURE OF HIGH TEMPERATURE HEATING FURNACE AND INSTALLATION METHOD

(71) Applicant: RISHANG (SUZHOU) LIGHT CHEMICAL TEXTILE HIGH-TECH CO., LTD, Suzhou (CN)

(72) Inventors: Bungo Hayashi, Suzhou (CN); Jiamei Wang, Suzhou (CN); Wujie Lin, Suzhou (CN)

(73) Assignee: RISHANG (SUZHOU) LIGHT CHEMICAL TEXTILE HIGH-TECH CO., LTD, Suzhou (CN)

( * ) Notice: Subject to any disclaimer, the term of this patent is extended or adjusted under 35 U.S.C. 154(b) by 457 days.

(21) Appl. No.: 17/411,004

(22) Filed: Aug. 24, 2021

(65) Prior Publication Data

US 2021/0381768 A1 Dec. 9, 2021

Related U.S. Application Data

(63) Continuation-in-part of application No. PCT/CN2020/100838, filed on Jul. 8, 2020.

(30) Foreign Application Priority Data

Sep. 10, 2019 (CN) ......................... 201910851968.8

(51) Int. Cl.
*F27D 1/02* (2006.01)
*F27D 1/00* (2006.01)
*F27D 1/14* (2006.01)

(52) U.S. Cl.
CPC ........... *F27D 1/024* (2013.01); *F27D 1/0009* (2013.01); *F27D 1/022* (2013.01); *F27D 1/145* (2013.01)

(58) Field of Classification Search
CPC ........ F27D 1/024; F27D 1/0009; F27D 1/022; F27D 1/145; F27D 1/10
See application file for complete search history.

(56) References Cited

U.S. PATENT DOCUMENTS 4,045,924 A 9/1977 Jones
4,341,916 A * 7/1982 Byrd, Jr. ................ F27D 11/02 373/128

(Continued)

FOREIGN PATENT DOCUMENTS

CN 2575107 Y 9/2003
CN 201215439 Y 4/2009

(Continued)

OTHER PUBLICATIONS

International Search Report issued in PCT/CN2020/100838, dated Oct. 9, 2020, and English translations thereof.

(Continued)

*Primary Examiner* — David J Laux
(74) *Attorney, Agent, or Firm* — ARC IP Law, PC; Joseph J. Mayo

(57) ABSTRACT

A modular structure wall of a high-temperature heating furnace including furnace wall main trusses and a furnace roof truss. Connecting I-beams are fixed on the bottom surface of the furnace roof truss, top clamping structures of hoisting outer screws are hooked with the bottoms of the connecting I-beams, the upper surfaces of ceramic fiber cotton modules are uniformly distributed with upwardly convex hoisting outer screws, and the ceramic fiber cotton modules are installed on the lower surface of the furnace roof truss through the hoisting outer screws. A gap is formed between the ceramic fiber cotton modules and the lower surfaces of the connecting I-beams, a ceramic fiber cotton felt is laid in the gap area between the ceramic fiber cotton modules and the lower surfaces of the connecting I-beams, (Continued)

and a furnace wall inner protective lining is fixedly installed on the lower surfaces of the ceramic fiber cotton modules.

10 Claims, 3 Drawing Sheets

(56) References Cited

U.S. PATENT DOCUMENTS

| | | | | | |
|---|---|---|---|---|---|
| 4,473,015 | A * | 9/1984 | Hounsel | F27D 1/18 | 52/474 |
| 4,475,470 | A * | 10/1984 | Merkle | F27D 1/02 | 110/332 |
| 4,580,974 | A * | 4/1986 | Braschler | F27D 1/141 | 110/332 |
| 4,640,202 | A * | 2/1987 | Schraff | F27D 1/021 | 266/280 |
| RE33,463 | E * | 11/1990 | Sauder | F27D 1/002 | 428/920 |
| 5,059,369 | A * | 10/1991 | Schiferl | A61N 1/365 | 264/273 |
| 5,511,356 | A * | 4/1996 | Schultz | E04F 13/0835 | 52/746.1 |
| 9,310,132 | B1 * | 4/2016 | Gaur | F27D 1/0013 | |
| 2008/0271655 | A1 * | 11/2008 | Materna | F27D 99/007 | 110/332 |

FOREIGN PATENT DOCUMENTS

| | | | |
|---|---|---|---|
| CN | 202171397 | U | 3/2012 |
| CN | 202928360 | U | 5/2013 |
| CN | 103292598 | A | 9/2013 |
| CN | 103727791 | A | 4/2014 |
| CN | 204085178 | U | 1/2015 |
| CN | 205066456 | U | 3/2016 |
| CN | 105674746 | A | 6/2016 |
| CN | 106839777 | A | 6/2017 |
| CN | 206682111 | U | 11/2017 |
| CN | 107726856 | A | 2/2018 |
| CN | 207113604 | U | 3/2018 |
| CN | 207351219 | U | 5/2018 |
| CN | 109535984 | A | 3/2019 |
| CN | 110455082 | A | 11/2019 |
| CN | 211233944 | U | 8/2020 |

OTHER PUBLICATIONS

Written Opinion issued in PCT/CN2020/100838, dated Oct. 9, 2020, and English translations thereof.

* cited by examiner

MODULAR ENCLOSURE STRUCTURE OF HIGH TEMPERATURE HEATING FURNACE AND INSTALLATION METHOD

TECHNICAL FIELD

The present invention relates to the technical field of heating furnace structures, in particular to a modular structure wall of a high-temperature heating furnace. The present invention further provides an installation method of the modular wall.

BACKGROUND

At present, the furnace wall materials of the ethylene cracking furnace are mostly made of ceramic fiber cotton, and the furnace walls of high-temperature heating furnaces such as steel heating furnaces and ceramic heating furnaces are mostly made of refractory bricks and high-temperature resistant castable.

The walls made of ceramic fiber cotton, refractory bricks and high-temperature resistant castable of high-temperature heating furnaces have the following common disadvantages:

1) Low thermal radiation coefficient, resulting in low efficiency of radiation heat transfer on furnace inner walls; and 2) Under the long-term action of the high-temperature heat flow environment in the furnaces, crystallization and pulverization occur from the outside to the inside, which shortens the service life of the furnace walls.

Compared with ceramic fiber cotton furnace walls, furnace walls made of refractory bricks and high-temperature resistant castable further have the following disadvantages:

1) The furnace wall thickness needs to be increased by about 50% to achieve the same thermal insulation effect as that of the ceramic fiber-cotton furnace wall due to the disadvantages of the thermal insulation performance and the poor thermal insulation effect. The furnace floor area is increased, and the construction requirement is high and the labor consumption is high.

2) The total size of the furnace walls is increased due to the thickness of the furnace walls is increased, resulting in a high heat capacity of the furnace walls. Therefore, the process of igniting and heating up, and shutting down and cooling down the furnaces not only wastes heat energy but also takes a long time, which hinders the normal production of the furnaces.

3) After a certain years of service, cracks appear, and the high-temperature flame in the furnace bursts out of the cracks, resulting in a waste of heat.

A traditional repair method for furnace walls made of refractory bricks and high-temperature resistant castable is to remove damaged parts and use new bricks or low-cement castable to cast the dismantled parts as a whole.

The patent with publication number CN201215439Y discloses Wall repairing structure of walking beam heating furnace, for the disclosed structure, although making a big step forward as compared with the traditional repair method, this repair method only increases the repair speed without changing the nature of the furnace walls, that is, without contributing to prolonging the service life of the furnace walls or improving the efficiency of radiation heat transfer on the furnace inner walls.

The patent with publication number CN205066456U discloses Novel anti-burn-through refractory heat-insulating furnace wall for forging furnace, and provides a novel anti-burn-through refractory heat-insulating furnace wall for forging furnace which can adjust the thickness freely, reduce the types of refractory bricks required, lower construction difficulty and labor costs, avoid burn through of heat insulation layers, and ensure the low temperature of steel plates outside the furnace. Specifically, the cross section of the furnace wall from the outside to the inside sequentially includes "three fiber blanket insulation layers, two machine-made fiberboard insulation layers, a diatomaceous earth brick insulation layer, two clay brick refractory layers and a castable refractory layer which are arranged in sequence on the inner side of a steel plate layer". Although the invention described in the document has a certain contribution to the prevention of burn through of the furnace walls, since the castable refractory layer still faces the high temperature environment in the furnace, the first problem of cracks and surface layer differentiation in the castable refractory layer is not fundamentally changed, and the second problem of the radiation heat transfer performance of the inner wall of the furnace is not changed.

In order to improve the efficiency of radiation heat transfer on the inner walls of high-temperature heating furnaces, a wide variety of energy-saving coatings have been used in recent decades. Although the use temperature, technical performance and use effect are different, the obvious energy-saving effect is recognized. A major problem of spraying energy-saving coating on the inner wall of a high-temperature heating furnace is that the coating is liable to fall off, which has become a bottleneck for application and popularization. In addition to the technical level of the coating product, the reason for the falling off is that the ceramic fiber cotton, refractory bricks, high-temperature resistant castable and other furnace wall materials face the high temperature environment in the furnace for a long time and gradually crystallize and pulverize, then the shear stress between the coating and the furnace wall loses, and the coating falls off.

The patent with application publication number CN109535984A discloses Ultra-high temperature infrared radiation heat preservation and energy-saving coating. The coating can withstand a high temperature of 1800° C. The selected fillers of fused white corundum powder and tabular corundum powder also have excellent high temperature resistance. On the one hand, the high temperature resistance of the coating can be ensured. On the other hand, the coating and the inner wall of the furnace wall are closely connected to ensure that the coating does not fall off, since most of the inner walls of high-temperature kilns are made of corundum hollow ball bricks, and materials of the same nature are easily permeated and sintered into one body without the presence of low-melting substances. However, the coating described in the document still does not solve the problem that the inner wall of the furnace wall faces the high temperature environment in the furnace for a long time and gradually crystallizes and powders, which causes the coating to fall off.

The patent with the publication number CN2575107Y discloses Spacer for high-temperature heating furnace, the spacer is formed by stacking arc-shaped strips or plates made of tungsten powder or molybdenum powder or doped tungsten powder and molybdenum powder into a cylinder like a masonry wall to form the spacer of a heating furnace, which separates the sintered material from the refractory material, avoids the pollution of the sintered material, reduces the wear of the refractory material, and prolongs the service life of the refractory material. However, the heating furnace spacer provided in the patent document does not have the advantage of improving the radiation heat transfer performance of the inner wall of the furnace, and the technical background is proposed for tungsten and molybdenum induction sintering furnaces, and it is not indicated whether the patent is suitable for high-temperature heating furnaces in the steel, ceramics and petrochemical industries.

The patent with publication number CN2575107Y provides an energy-saving method for a tubular heating furnace, which solves the technical problem of being unable to reliably install numerous black-body elements with a certain weight on light and soft refractory fiber linings, and thus, the invention objectives of good energy-saving effect, low operating cost and easy implementation are realized. Specifically, the heating furnace is hollow inside, one end is an opening pointing to the center of the furnace, and the other end is a black body element tapered into the refractory fiber lining of the furnace wall. However, the black body elements provided in the patent document have the following disadvantages: 1. The furnace space is occupied, and the production operation is hindered; and 2. The inner wall of the originally flat furnace wall become greatly uneven due to the black body elements, which reduces the radiation heat transfer effect and convective heat transfer effect in the furnace, in addition, the black body element materials and adhesives are based on the existing technology in the field, and the materials do not have original contributions to improve the energy-saving effect.

SUMMARY

In view of the above problems, the present invention provides a modular structure wall of a high-temperature heating furnace, which greatly increases the radiation coefficient of an inner wall of the high-temperature heating furnace, significantly enhances the heat transfer efficiency in the furnace, saves energy, reduces emissions, slows down the aging process of the furnace wall and prolongs the service life of the furnace wall.

The technical solution of a modular structure wall of a high-temperature heating furnace is as follows: the modular structure wall includes preset furnace wall main trusses and a furnace roof truss, and is characterized in that: corresponding connecting I-beams are respectively fixed on the bottom surface of the furnace roof truss, top clamping structures of hoisting outer screws are hooked with the bottoms of the connecting I-beams, the upper surfaces of ceramic fiber cotton modules are uniformly distributed with upwardly convex hoisting outer screws, the ceramic fiber cotton modules are installed on the lower surface of the furnace roof truss through the hoisting outer screws, a gap is formed between the ceramic fiber cotton modules and the lower surfaces of the connecting I-beams, a ceramic fiber cotton felt is laid on the gap area between the ceramic fiber cotton modules and the lower surfaces of the connecting I-beams, and an inner protective lining of the furnace wall is fixedly arranged on the lower surfaces of the ceramic fiber cotton modules; and each set of the furnace wall main trusses located on the periphery is internally provided with first connectors arranged in an array, the inner sides of the first connectors are respectively fixed to the outer surfaces of wall modules of corresponding shapes, the inner surfaces of the wall modules are fixedly provided with an inner protective lining of the furnace wall, and the wall modules are composed of the outer shell steel plates, the ceramic fiber cotton felt and the ceramic fiber cotton modules in sequence from the outside to the inside.

The modular structure wall is further characterized in that:

a plurality of steel beam frames are evenly distributed in the surface area of the outer shell steel plates, the inner surfaces in the thickness direction of the adjacent steel beam frames are covered with the corresponding outer shell steel plates, the inner end of each steel beam frame in the thickness direction is fixedly connected with the ceramic fiber cotton modules in the corresponding positions through second connectors, the space between the outer surfaces of the ceramic fiber cotton modules and the inner surfaces of the outer shell steel plates is filled with the ceramic fiber cotton felt, and the inner surfaces of the ceramic fiber cotton modules are fixedly provided with the inner protective lining of the furnace wall;

the steel beam frames are stable plane truss structures formed by riveting and welding angle steel, square steel, flat steel, pipes and the like, the outer shell steel plates are welded and riveted on the inner side area of the steel beam frames, the outer ends of the second connectors are riveted or welded to the inner ends of the steel beam frames in the thickness direction in an array, and the inner ends of the second connectors are fixedly connected with a prime number of ceramic fiber cotton modules in corresponding positions;

the second connectors are specifically bolts or screws made of a high-temperature resistant material;

the furnace wall main trusses is a stable truss structure formed by riveting and welding channel steel, I-beams, angle steel, square steel and pipes according to the design requirements, the first connectors are riveted and welded in an array on the inner furnace sides of the furnace wall main trusses, and the furnace wall main trusses form an outer frame of the surrounding wall of the high-temperature heating furnace;

the furnace roof truss is a stable truss structure formed by riveting and welding channel steel, I-beams, angle steel, square steel and pipes according to design requirements, the bottom surface of the furnace roof truss is provided with the connecting I-beams, and the furnace roof truss forms an outer frame of the furnace top wall of the high-temperature heating furnace;

the inner protective lining of the furnace wall is specifically composed of composite ceramic sheets, and the composite ceramic sheets are fixedly installed on the ceramic fiber cotton modules through self-locking ceramic nails;

each ceramic fiber cotton module is provided with an installation guide hole, the outer side of each installation guide hole is provided with a small-diameter through hole, and the diameter of each installation guide hole is larger than that of the small-diameter through hole;

when the ceramic fiber cotton modules are used for side wall installation, inner protruding ends of the second connectors are penetrated through the small-diameter through holes, then located in the installation guide holes and connected with inner nuts through threads, and the outer diameter of the inner nut is larger than that of the small-diameter through hole;

when the ceramic fiber cotton modules are used for top wall installation, lower threaded cylinders of the hoisting outer screws are penetrated through the small-diameter through holes, then located in the installation guide holes and connected with the inner nuts through threads, the outer diameter of the inner nut is larger than that of the small-diameter through hole, and therefore the upwardly convex hoisting outer screws can be conveniently arranged on the ceramic fiber cotton modules used for top wall installation;

the top clamping structures of the hoisting outer screws are specifically upwardly convex crab-claw-shaped structures which are symmetrically arranged and bent inwardly, paired inner bends of the crab-claw-shaped structures are respectively supported by the upper surfaces of the two sides of lower cross bars of the connecting I-beams, the hoisting outer screws are slidably arranged in the length direction of the connecting I-beams, and the corresponding positions are determined according to the positions of the hoisting outer screws;

when the composite ceramic sheets are installed on the top wall, the self-locking ceramic nails are penetrated through installation holes of the composite ceramic sheets firstly, and then the composite ceramic sheets are inserted from the lower ends of the ceramic fiber cotton modules, so that the composite ceramic sheets cover the surface area of the installation guide holes, the self-locking ceramic nails upwardly penetrate the ceramic fiber cotton modules by the thickness, then nail tips protrude outwards, the U-shaped clips clamp the lower end surfaces of the nail tips, and thus the self-locking ceramic nails on the top wall are prevented from falling off; and the U-shaped clips are specifically made in flat U shape machined with metal wires or ceramic materials, the width of U-shaped grooves is tightly matched with the diameter of the self-locking ceramic nails, and the groove depth is greater than the diameter of the self-locking ceramic nails.

An installation method of a modular structure wall of a high-temperature heating furnace is characterized in that other structures required by the design of the high-temperature heating furnace, as well as the position of a vent and a hard refractory structure near the vent are not changed, and only the materials, structures and the installation method of the surrounding furnace wall and the top furnace wall are changed, the surrounding furnace wall adopts wall modules instead of castable or refractory bricks adopted by traditional furnace walls, the wall modules are fixedly installed on the inner sides of furnace wall main trusses, and a furnace wall inner protective lining is installed on the inner furnace side of the wall modules; and the wall modules are composed of outer shell steel plates, a ceramic fiber cotton felt and ceramic fiber cotton modules sequentially from the outside to the inside;

the top furnace wall is hoisted by sliding hoisting outer screws in from the lower end surfaces of connecting I-beams located on the inner side of a furnace roof truss, and installing the ceramic fiber cotton modules on the lower surface of the furnace roof truss through the hoisting outer screws, then the end surfaces of the I-beams are processed, the ceramic fiber cotton module felt is arranged on the upper layers of the I-beams, and finally a furnace wall inner protective lining is installed on the inner furnace side of the ceramic fiber cotton modules; and according to the design requirements, the furnace wall main trusses and the furnace wall roof truss are constructed on the high-temperature heating furnace site, then the wall modules are installed, the ceramic fiber cotton modules are hoisted, and finally the furnace wall lining is installed.

The modular structure wall is further characterized in that: the wall modules, the inner protective lining of the furnace wall and the hoisting outer screws can be processed into finished products in advance at the production base outside the high-temperature heating furnace site, and then conveyed to the site where the high-temperature heating furnace needs to be built and installed to complete the furnace wall construction; the models of the ceramic fiber cotton felt and the ceramic fiber cotton modules can be selected from commercial products according to the temperature requirements of the high-temperature heating furnace; and the inner protective lining of the furnace wall is specifically a series product described in patent documents CN106839777A, CN103292598A, CN206682111U, and CN107726856A, and is mainly composed of composite ceramic sheets and self-locking ceramic nails, and the inner protective lining of the furnace wall is installed on the inner furnace sides of the wall modules and the top ceramic fiber cotton modules like an armor.

After the above technical solution is adopted, the high-temperature heating furnace can be constructed quickly and conveniently, the heat transfer efficiency in the furnace can be greatly improved, energy is saved, emission is reduced, the aging process of the furnace wall is slowed down, and the service life of the furnace wall is prolonged. In particular, high-temperature resistant castable furnace walls are replaced with those of the present invention, the advantages of reducing the weight of the wall and reducing the area of the furnace are achieved; meanwhile, the problem of cracks in the wall is avoided, and the wall heat dissipation and maintenance costs are greatly reduced; and the time of ignition temperature rise and shutdown temperature reduction is shortened, so that the non-productive time of the furnace is shortened.

Figure 1:
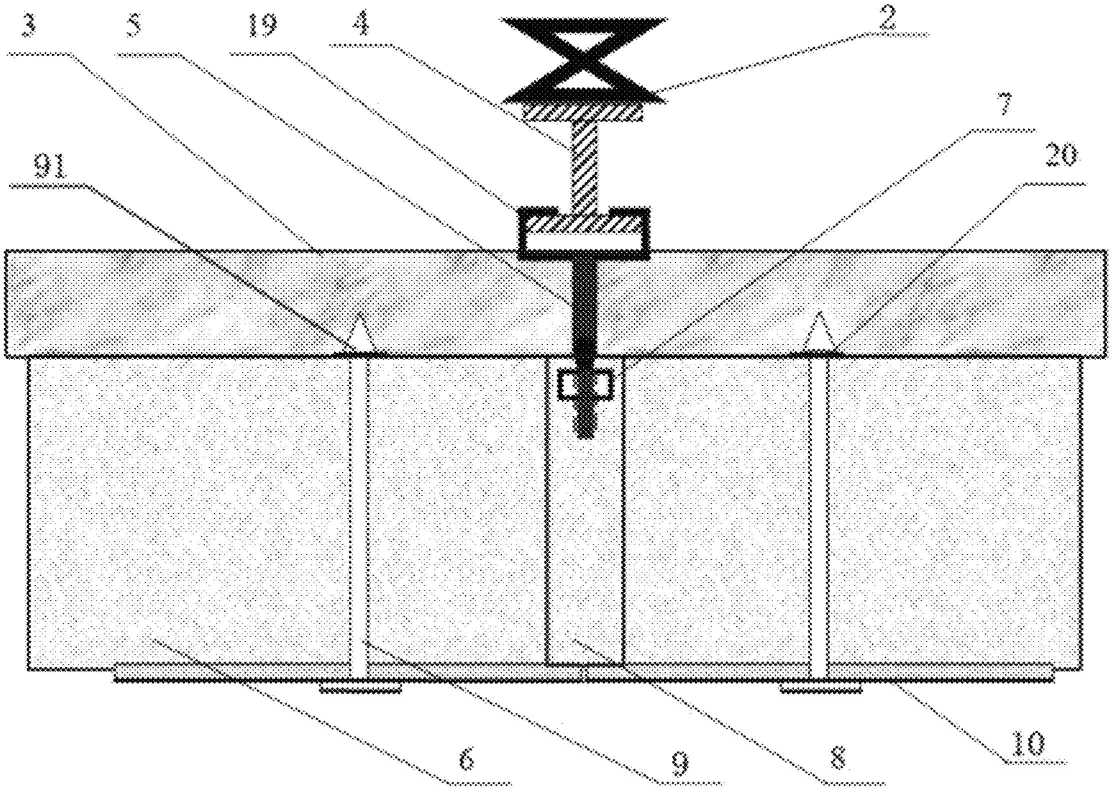
FIG. 1 is a schematic diagram of the cross-sectional structure of a top furnace wall of the present invention.

The names corresponding to the serial numbers in the figures are as follows:

Furnace wall main trusses 1, furnace roof truss 2, ceramic fiber cotton felt 3, connecting I-beams 4, hoisting outer screws 5, ceramic fiber cotton modules 6, inner nuts 7, installation guide holes 8, small-diameter through holes 81, self-locking ceramic nails 9, nail tips 91, composite ceramic sheets 10, first connectors 11, wall modules 12, steel beam trusses 13, outer shell steel plates 14, second connectors 15, cylinder 16, lower threaded cylinders 17, necking junctions 18, crab-claw-shaped structures 19 and U-shaped clips 20.

DETAILED DESCRIPTION

Figure 2:
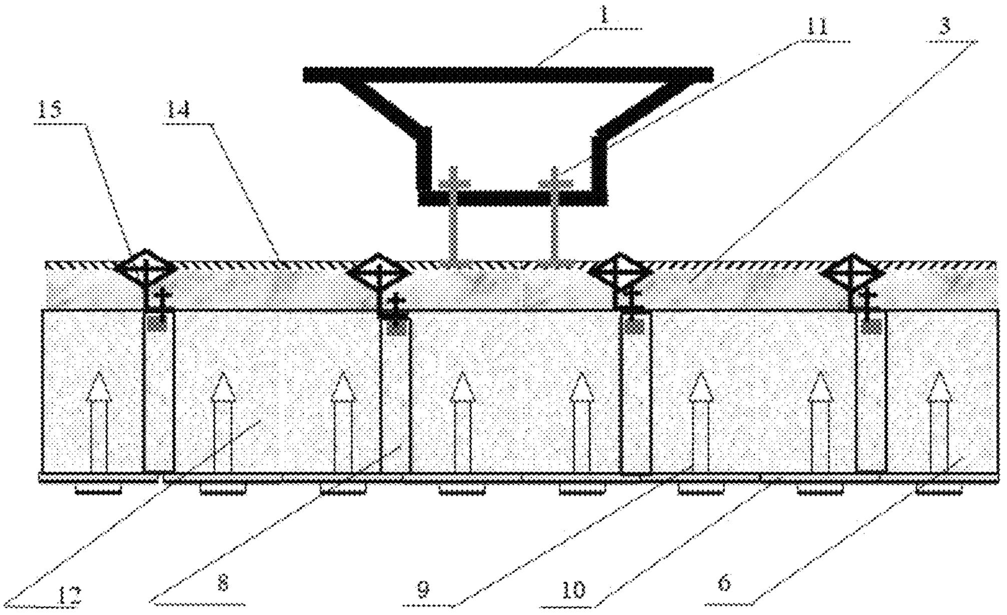
FIG. 2 is a schematic diagram of the cross-sectional structure of a surrounding furnace wall of the present invention.
Figure 3:
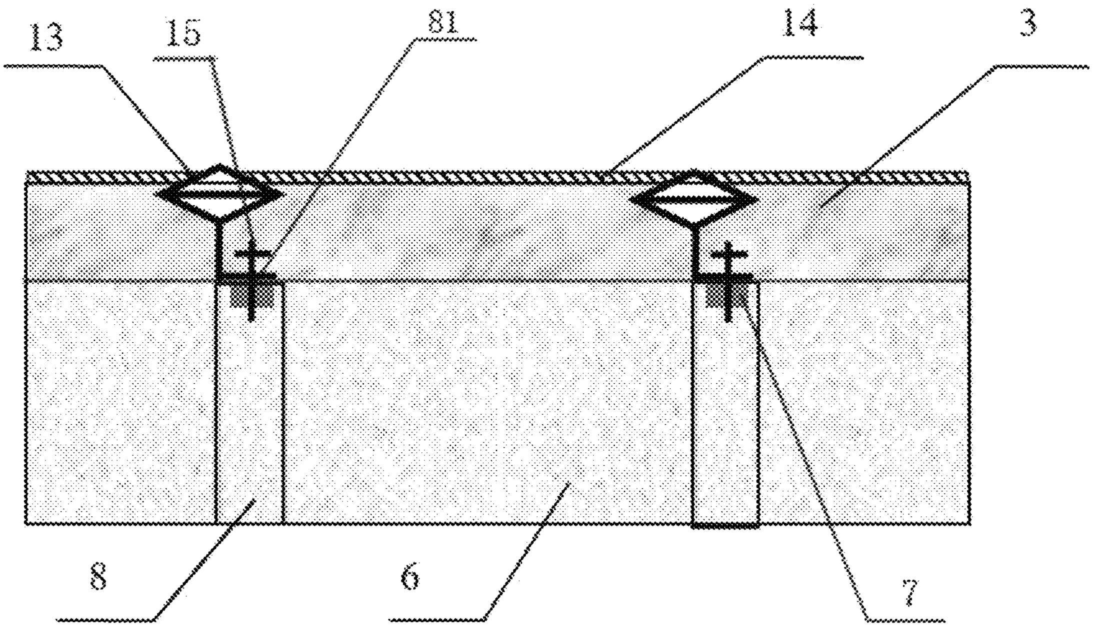
FIG. 3 is a schematic diagram of the cross-sectional structure of a wall module of the present invention.
Figure 4:
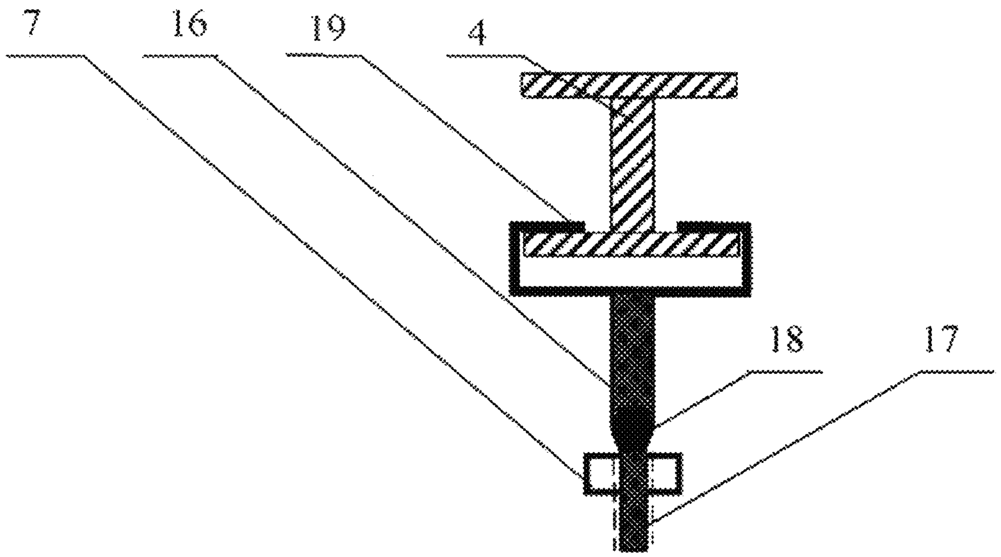
FIG. 4 is a schematic diagram of an installation structure of a hoisting outer screw and a connecting I-beam of the present invention.
Figure 5:
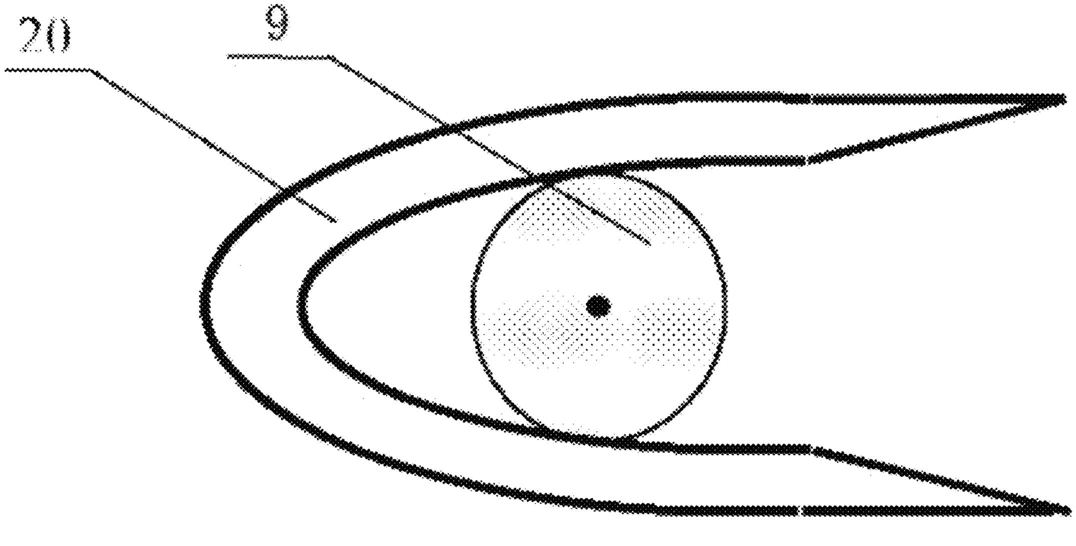
FIG. 5 is an installation schematic top view of a U-shaped clip and a self-locking ceramic nail of the present invention.

A modular structure wall of a high-temperature heating furnace is shown in FIG. 1 to FIG. 5, and includes preset furnace wall main trusses 1 and a furnace roof truss 2, corresponding connecting I-beams 4 are respectively fixed on the bottom surface of the furnace roof truss 2, and top clamping structures of hoisting outer screws 5 are hooked with the bottoms of the connecting I-beams 4, the upper surfaces of ceramic fiber cotton modules 6 are uniformly distributed with upwardly convex hoisting outer screws 5, the ceramic fiber cotton modules 6 are installed on the lower surface of the furnace roof truss 2 through the hoisting outer screws 5, a gap is formed between the ceramic fiber cotton modules 6 and the lower surfaces of the connecting I-beams 4, a ceramic fiber cotton felt 3 is laid on the gap area between the ceramic fiber cotton modules 6 and the lower surfaces of the connecting I-beams 4, and an inner protective lining of the furnace wall is fixedly arranged on the lower surfaces of the ceramic fiber cotton modules 6; and each set of the furnace wall main trusses 1 located on the periphery is internally provided with first connectors 11 arranged in an array, and the inner sides of the first connectors 11 are respectively fixed to the outer surfaces of wall modules 12 of corresponding shapes, the inner surfaces of the wall modules 12 are fixedly provided with an inner protective lining of the furnace wall, and the wall modules 12 are composed of outer shell steel plates 14, the ceramic fiber cotton felt 3 and the ceramic fiber cotton modules 6 in sequence from the outside to the inside.

A plurality of steel beam frames 13 are evenly distributed in the surface area of the outer shell steel plates 14, the inner surfaces in the thickness direction of the adjacent steel beam frames 13 are covered with the corresponding outer shell steel plates 14, the inner end of each steel beam frame 13 in the thickness direction is fixedly connected to the ceramic fiber cotton modules 6 in the corresponding positions through second connectors 15, the space between the outer surfaces of the ceramic fiber cotton modules 6 and the inner surfaces of the outer shell steel plates 14 is filled with the ceramic fiber cotton felt 3, and the inner surfaces of the ceramic fiber cotton modules 6 are fixedly provided with an inner protective lining of the furnace wall;

the steel beam frames 13 are stable plane truss structures formed by riveting and welding angle steel, square steel, flat steel, pipes and the like, the outer shell steel plates 14 are welded and riveted on the inner side area of the steel beam frames 13, the outer ends of the second connectors 15 are riveted or welded to the inner ends of the steel beam frames 13 in the thickness direction in an array, and the inner ends of the second connectors 15 are fixedly connected with a prime number of ceramic fiber cotton modules 6 in corresponding positions;

the second connectors 15 are specifically bolts or screws made of a high-temperature resistant material;

the furnace wall main trusses 1 is a stable truss structure formed by riveting and welding channel steel, I-beams, angle steel, square steel and pipes according to the design requirements, the first connectors 11 are riveted and welded in an array on the inner furnace sides of the furnace wall main trusses 1, and the furnace wall main trusses 1 form an outer frame of the periphery wall of the high-temperature heating furnace;

the furnace roof truss 2 is a stable truss structure formed by riveting and welding channel steel, I-beams, angle steel, square steel and pipes according to design requirements, the bottom surface of the furnace roof truss 2 is provided with the connecting I-beams 4, and the furnace roof truss 2 forms an outer frame of the furnace top wall of the high-temperature heating furnace;

the inner protective lining of the furnace wall is specifically composed of composite ceramic sheets 10, and the composite ceramic sheets 10 are fixedly arranged on the ceramic fiber cotton modules 6 through self-locking ceramic nails 9;

each ceramic fiber cotton module 6 is provided with an installation guide hole 8, the outer side of each installation guide hole 8 is provided with a small-diameter through hole 81, and the diameter of each installation guide hole 8 is larger than that of the small-diameter through hole 81;

when the ceramic fiber cotton modules 6 are used for side wall installation, inner protruding ends of the second connectors 15 are penetrated through the small-diameter through holes 81, then located in the installation guide holes 8 and connected with inner nuts 7 through threads, and the outer diameter of the inner nut 7 is larger than that of the small-diameter through hole 81;

when the ceramic fiber cotton modules 6 are used for top wall installation, lower threaded cylinders 17 of the hoisting outer screws 5 are penetrated through the small-diameter through holes 81, then located in the installation guide holes 8 and connected with the inner nuts 7 through threads, the outer diameter of the inner nut 7 is larger than that of the small-diameter through hole 81, and therefore the upwardly convex hoisting outer screws 5 can be conveniently arranged on the ceramic fiber cotton modules 6 used for top wall installation;

top clamping structures of the hoisting outer screws 5 are specifically upwardly convex crab-claw-shaped structures 19 which are symmetrically arranged and bent inwardly, wherein the top clamping structure is a crab-claw-shaped structure 19 comprising: a base; two side walls which are formed by the corresponding two sides, extending upwards in a vertical direction, of the base; and two bent portions which are formed by the two side walls extending inwardly in a horizontal direction respectively, wherein, the two bent portions are supported on the upper surface of lower cross bar of each of the connecting I-beams 4, and the hoisting outer screw 5 is slidably arranged along the length direction of each of the connecting I-beams 4. Paired inner bends of the crab-claw-shaped structures 19 are respectively supported by the upper surfaces of the two sides of lower cross bars of the connecting I-beams 4, the hoisting outer screws 5 are slidably arranged in the length direction of the connecting I-beams 4, and the corresponding positions are determined according to the positions of the hoisting outer screws 5;

each hoisting outer screw 5 sequentially includes a crab-claw-shaped structure 19, a cylinder 16, a necking junction 18 and a lower threaded cylinder 17 from top to bottom, wherein the outer diameter of the lower threaded body 17 is smaller than that of the cylinder 16 so that the lower threaded body 17 can be conveniently inserted into the corresponding small-diameter through hole 81;

when the composite ceramic sheets 10 are installed on the top wall, the self-locking ceramic nails 9 are penetrated through installation holes of the composite ceramic sheets 10 firstly, and then the composite ceramic sheets 10 are inserted from the lower ends of the ceramic fiber cotton modules 6, so that the composite ceramic sheets 10 cover the surface area of the installation guide holes 8, the self-locking ceramic nails 9 upwards penetrate the ceramic fiber cotton modules 6 by the thickness, then nail tips 91 protrude outwards, the U-shaped clips 20 clamp the lower end surfaces of the nail tips 91, and thus the self-locking ceramic nails 9 on the top wall are prevented from falling off; and the U-shaped clips 20 are specifically made in flat U shape machined with metal wires or ceramic materials, the width of U-shaped grooves is tightly matched with the diameter of the self-locking ceramic nails 9, and the groove depth is greater than the diameter of the self-locking ceramic nails.

An installation method of a modular structure wall of a high-temperature heating furnace is characterized in that other structures required by the design of the high-temperature heating furnace, as well as the position of a vent and a hard refractory structure near the vent are not changed, and only the materials, structures and the installation method of the surrounding furnace wall and the top furnace wall are changed, the surrounding furnace wall adopts wall modules instead of castable or refractory bricks adopted by traditional furnace walls, the wall modules are fixedly installed on the inner sides of furnace wall main trusses, and a furnace wall inner protective lining is installed on the inner furnace side of the wall modules; and the wall modules are composed of the outer shell steel plates, a ceramic fiber cotton felt and ceramic fiber cotton modules sequentially from the outside to the inside;

the top furnace wall is hoisted by sliding the hoisting outer screws from the lower end surfaces of the connecting I-beams located on the inner side of the furnace roof truss, and installing the ceramic fiber cotton modules on the lower surface of the furnace roof truss through the hoisting outer screws, then the end surfaces of the I-beams are processed, the ceramic fiber cotton module felt is arranged on the upper layers of the I-beams, and finally an furnace wall inner protective lining is installed on the inner furnace side of the ceramic fiber cotton modules; and according to the design requirements, the furnace wall main trusses and the furnace wall roof truss are constructed on the high-temperature heating furnace site, then the wall modules are installed, the ceramic fiber cotton modules are hoisted, and finally a furnace wall lining is installed.

The wall modules, the inner protective lining of the furnace wall and the hoisting outer screws can be processed into finished products in advance at the production base outside the high-temperature heating furnace site, and then conveyed to the site where the high-temperature heating furnace needs to be built and installed to complete the furnace wall construction; the models of the ceramic fiber cotton felt and the ceramic fiber cotton modules can be selected from commercial products according to the temperature requirements of the high-temperature heating furnace; and the inner protective lining of the furnace wall is specifically a series product described in patent documents CN106839777A, CN103292598A, CN206682111U, and CN107726856A, and is mainly composed of composite ceramic sheets and self-locking ceramic nails, and the inner protective lining of the furnace wall is installed on the inner furnace sides of the wall modules and the top ceramic fiber cotton modules like an armor.

After the above technical solution is adopted, the high-temperature heating furnace can be constructed quickly and conveniently, the heat transfer efficiency in the furnace can be greatly improved, energy is saved, emission is reduced, the aging process of the furnace wall is slowed down, and the service life of the furnace wall is prolonged. In particular, high-temperature resistant castable furnace walls are replaced with those of the present invention, the advantages of reducing the weight of the wall and reducing the area of the furnace are achieved; meanwhile, the problem of cracks in the wall is avoided, and the wall heat dissipation and maintenance costs are greatly reduced; and the time of ignition temperature rise and shutdown temperature reduction is shortened, so that the non-productive time of the furnace is shortened.

For those skilled in the art, it is obvious that the present invention is not limited to the details of the foregoing exemplary embodiments, and the present invention can be implemented in other specific forms without departing from the spirit or basic characteristics of the present invention. Therefore, from any point of view, the embodiments should be regarded as exemplary and non-limiting. The scope of the present invention is defined by the appended claims rather than the above description, and therefore the present invention intends to encompass all changes within the meaning and scope of equivalent elements of the claims. Any reference symbols in the claims should not be regarded as limiting the claims involved.

In addition, it should be understood that although the specification is described in accordance with the implementation modes, not each implementation mode only includes an independent technical solution. This narration in the specification is only for clarity, those skilled in the art should regard the specification as a whole, and the technical solutions in the various embodiments can also be appropriately combined to form other implementations that can be understood by those skilled in the art.

What is claimed is:

1. A modular enclosure structure of a high-temperature heating furnace comprising:

a furnace wall comprising
  furnace wall main truss;
  a plurality of first connectors clamped and fixed to an inner side of the furnace wall main truss; and
  a wall module connected and fixed to inner sides of the plurality of first connectors, and the wall module comprises
    an outer shell steel plate,
    a ceramic fiber cotton felt, and
    a ceramic fiber cotton module sequentially arranged from an outside to an inside,
    wherein, an inner surface of the ceramic fiber cotton module of the furnace wall is provided with a furnace wall inner protective lining; and a furnace roof comprising
  a furnace roof truss;
  a plurality of connecting I-beams connected and fixed at a bottom of the furnace roof truss, wherein a top clamping structure is clamped and fixed under each of the plurality of connecting I-beams;
  a hoisting outer screw connected and fixed at a bottom of the top clamping structure; and
  a ceramic fiber cotton module connected and fixed below the hoisting outer screw, wherein a lower surface of the ceramic fiber cotton module of the furnace roof is provided with a furnace wall inner protective lining,
    wherein, a gap area is formed between the ceramic fiber cotton module of the furnace roof and the plurality of connecting I-beams, and the ceramic fiber cotton felt of the furnace wall is laid in the gap area.

2. The modular enclosure structure of the high-temperature heating furnace according to claim 1, wherein a plurality of steel beam frames are evenly distributed on the outer shell steel plate, an inner end of a steel beam frame of the plurality of steel beam frames is fixed and connected with the ceramic fiber cotton module of the furnace wall through a second connector, a space between an outer surface of the ceramic fiber cotton module of the furnace wall and an inner surface of the outer shell steel plate is filled with the ceramic fiber cotton felt of the furnace wall, and inner surfaces of the ceramic fiber cotton felt of the furnace wall are fixedly provided with the furnace wall inner protective lining.

3. The modular enclosure structure of the high-temperature heating furnace according to claim 2, wherein each of the plurality of steel beam frames is a truss structure formed by riveting or welding angle steel, square steel, flat steel or pipes, wherein the outer shell steel plate is fixed and connected with an inner side of the steel beam frame by riveting or welding, an outer end of the second connector is fixed and connected with the inner side of the steel beam frame by riveting or welding, and an inner end of the second connector is fixed and connected with the ceramic fiber cotton module of the furnace wall.

4. The modular enclosure structure of the high-temperature heating furnace according to claim 3, wherein the second connector is a bolt or a screw made of a high-temperature resistant material.

5. The modular enclosure structure of the high-temperature heating furnace according to claim 1, wherein the furnace wall main truss is a truss structure formed by riveting or welding channel steel, I-beams, angle steel, square steel or pipes, a first connector of the plurality of first connectors is evenly distributed on the inner side of the furnace wall main truss, and each of the plurality of first connectors is connected and fixed with the furnace wall main truss by riveting or welding.

6. The modular enclosure structure of the high-temperature heating furnace according to claim 1, wherein the furnace roof truss is a truss structure formed by riveting or welding channel steel, I-beams, angle steel, square steel or pipes.

7. The modular enclosure structure of the high-temperature heating furnace according to claim 1, wherein the furnace wall inner protective lining of the furnace roof and the furnace wall inner protective lining of the furnace wall are composite ceramic sheets, and the composite ceramic sheets of the furnace roof or the furnace wall are connected and fixed to an inner side of the ceramic fiber cotton module of the furnace roof through plenty of self-locking ceramic nails, the composite ceramic sheets of the furnace wall are connected and fixed to an inner side of the ceramic fiber cotton module of the furnace wall through plenty of self-locking ceramic nails.

8. The modular enclosure structure of the high-temperature heating furnace according to claim 1, wherein the top clamping structure is a crab-claw-shaped structure comprising a base;

two side walls which are formed by corresponding two sides, extending upwards in a vertical direction, of the base; and two bent portions which are formed by the two side walls extending inwardly in a horizontal direction respectively, wherein, the two bent portions are supported on an upper surface of lower cross bar of each of the plurality of connecting I-beams, and the hoisting outer screw is slidably arranged along a length direction of each of the plurality of connecting I-beams.

9. The modular enclosure structure of the high-temperature heating furnace according to claim 7, wherein the plenty of self-locking ceramic nails of the furnace roof are penetrated through installation holes of the composite ceramic sheets of the furnace roof, and nail tips are exposed after the plenty of self-locking ceramic nails pierce the ceramic fiber cotton module of the furnace roof, such that the composite ceramic sheets of the furnace roof are connected and fixed to lower sides of the ceramic fiber cotton module of the furnace roof, the composite ceramic sheets of the furnace roof cover installation guide holes, and U-shaped clips are clamped and fixed to lower portions of the nail tips.

10. An installation method for a modular enclosure structure of a high-temperature heating furnace, said modular enclosure structure of a high-temperature heating furnace comprising a furnace wall comprising furnace wall main truss;

a plurality of first connectors clamped and fixed to an inner side of the furnace wall main truss; and a wall module connected and fixed to inner sides of the plurality of first connectors, and the wall module comprises an outer shell steel plate, a ceramic fiber cotton felt, and a ceramic fiber cotton module sequentially arranged from an outside to an inside, wherein, an inner surface of the ceramic fiber cotton module of the furnace wall is provided with a furnace wall inner protective lining; and a furnace roof comprising a furnace roof truss;

a plurality of connecting I-beams connected and fixed at a bottom of the furnace roof truss, wherein a top clamping structure is clamped and fixed under each of the plurality of connecting I-beams;

a hoisting outer screw connected and fixed at a bottom of the top clamping structure; and a ceramic fiber cotton module connected and fixed below the hoisting outer screw, wherein a lower surface of the ceramic fiber cotton module of the furnace roof is provided with a furnace wall inner protective lining, wherein, a gap area is formed between the ceramic fiber cotton module of the furnace roof and the plurality of connecting I-beams, and the ceramic fiber cotton felt of the furnace wall is laid in the gap area, said installation method comprising:

assembling said furnace wall main truss and said furnace roof truss;

fixing and installing said wall module on the inner side of the furnace wall main truss, and installing said furnace wall inner protective lining of the furnace wall on the inner sides of the wall module; and sliding said hoisting outer screw in from a lower cross bar of a connecting I-beam of the plurality of connecting I-beams at the bottom of the furnace roof truss and positioning the hoisting outer screw, connecting and fixing the ceramic fiber cotton module under the hoisting outer screw, then arranging said ceramic fiber cotton felt in said gap area between the ceramic fiber cotton module of the furnace roof and the plurality of connecting I-beams, and finally installing said furnace wall inner protective lining on the inner sides of the ceramic fiber cotton module of the furnace roof.

* * * * *